United States Patent
Amirghodsi et al.

(10) Patent No.: US 9,710,898 B2
(45) Date of Patent: Jul. 18, 2017

(54) IMAGE SYNTHESIS UTILIZING AN ACTIVE MASK

(71) Applicant: ADOBE SYSTEMS INCORPORATED, San Jose, CA (US)

(72) Inventors: Sohrab Amirghodsi, Seattle, WA (US); Elya Shechtman, Seattle, WA (US); Daniel Robert Goldman, Seattle, WA (US); Aliakbar Darabi, Newcastle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/945,308

(22) Filed: Nov. 18, 2015

(65) Prior Publication Data

US 2017/0140514 A1     May 18, 2017

(51) Int. Cl.
*G06K 9/20*     (2006.01)
*G06T 5/50*     (2006.01)
*G06T 11/00*    (2006.01)

(52) U.S. Cl.
CPC ............. *G06T 5/50* (2013.01); *G06T 11/001* (2013.01); *G06T 2200/24* (2013.01); *G06T 2207/10024* (2013.01)

(58) Field of Classification Search
CPC ..... G03F 7/70691; G06K 9/6202; G06K 9/68
See application file for complete search history.

(56) References Cited

U.S. PATENT DOCUMENTS

| 7,978,906 B2 * | 7/2011 | Jojic | G06K 9/469 382/159 |
| 8,625,927 B2 * | 1/2014 | Shechtman | G06K 9/6203 382/278 |
| 2013/0051685 A1 * | 2/2013 | Shechtman | G06T 11/60 382/218 |
| 2015/0161774 A1 | 6/2015 | Isogai et al. | |

OTHER PUBLICATIONS

Combined Search and Examination Report for GB Application No. 1615368.6, mailed Feb. 28, 2017, 5 pages.

* cited by examiner

*Primary Examiner* — Eueng-Nan Yeh
(74) *Attorney, Agent, or Firm* — Shook, Hardy & Bacon, L.L.P.

(57) ABSTRACT

Embodiments of the present invention provide systems, methods, and computer storage media directed at image synthesis utilizing an active mask. In one embodiment, input is received that identifies a target region within an image that is to be synthesized. A patch synthesis technique can then be performed to synthesize the target region based on portions of a source region that are identified by the patch synthesis technique. In embodiments, the patch synthesis technique includes, for at least one iteration, generating an active mask that indicates one or more portions of the target region as inactive. This active mask can be utilized by at least one process of the patch synthesis technique to ignore the one or more portions indicated as inactive by the active mask for the at least one iteration of the patch synthesis technique. Other embodiments may be described and/or claimed.

20 Claims, 8 Drawing Sheets
(2 of 8 Drawing Sheet(s) Filed in Color)

IMAGE SYNTHESIS UTILIZING AN ACTIVE MASK

BACKGROUND

Digital image editing has become increasingly more popular as digital image capture devices have become somewhat ubiquitous. An individual, for instance, may carry a mobile phone, dedicated camera, or the like that the individual can utilize to capture digital images of scenes (e.g., landscape, room, sporting event etc.) that are of interest. In some instances, these digital images do not capture the scene as desired. In such instances, digital image editing techniques can be employed to modify the digital image to achieve a desired result. Some of these digital image editing techniques utilize patch synthesis techniques that can be utilized to synthesize a region of the digital image. These patch synthesis techniques typically perform iterative analysis to identify correspondence between the region to be synthesized and corresponding regions from one or more images. These corresponding regions can include corresponding regions of the digital image itself that occur outside of the region to be synthesized. These corresponding regions can then be utilized to generate the synthesized region. Such digital image editing techniques may include, for example, image completion, image reshuffling, or texture synthesis.

Conventional patch synthesis techniques perform a significant number of calculations which can require a substantial amount of time and computing resources to complete. As such, conventional patch synthesis techniques may not be sufficiently interactive for a user and may not be readily performable on devices having limited computing power, such as, for example mobile phones.

SUMMARY

Embodiments of the present invention are directed towards patch synthesis techniques that utilize an active mask to identify those pixels within a target region that are still active, or have yet to converge, and those pixels within the target region that are no longer active, or have converged. Utilizing this active mask in conjunction with one or more iterations of a patch synthesis technique can limit the processing of pixels that lie within the target region, for those one or more iterations, to only those pixels that are indicated as active within the active mask. As such, a great deal of processing time and resources can be saved by preventing additional processing of pixels that gain no benefit from the additional processing.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
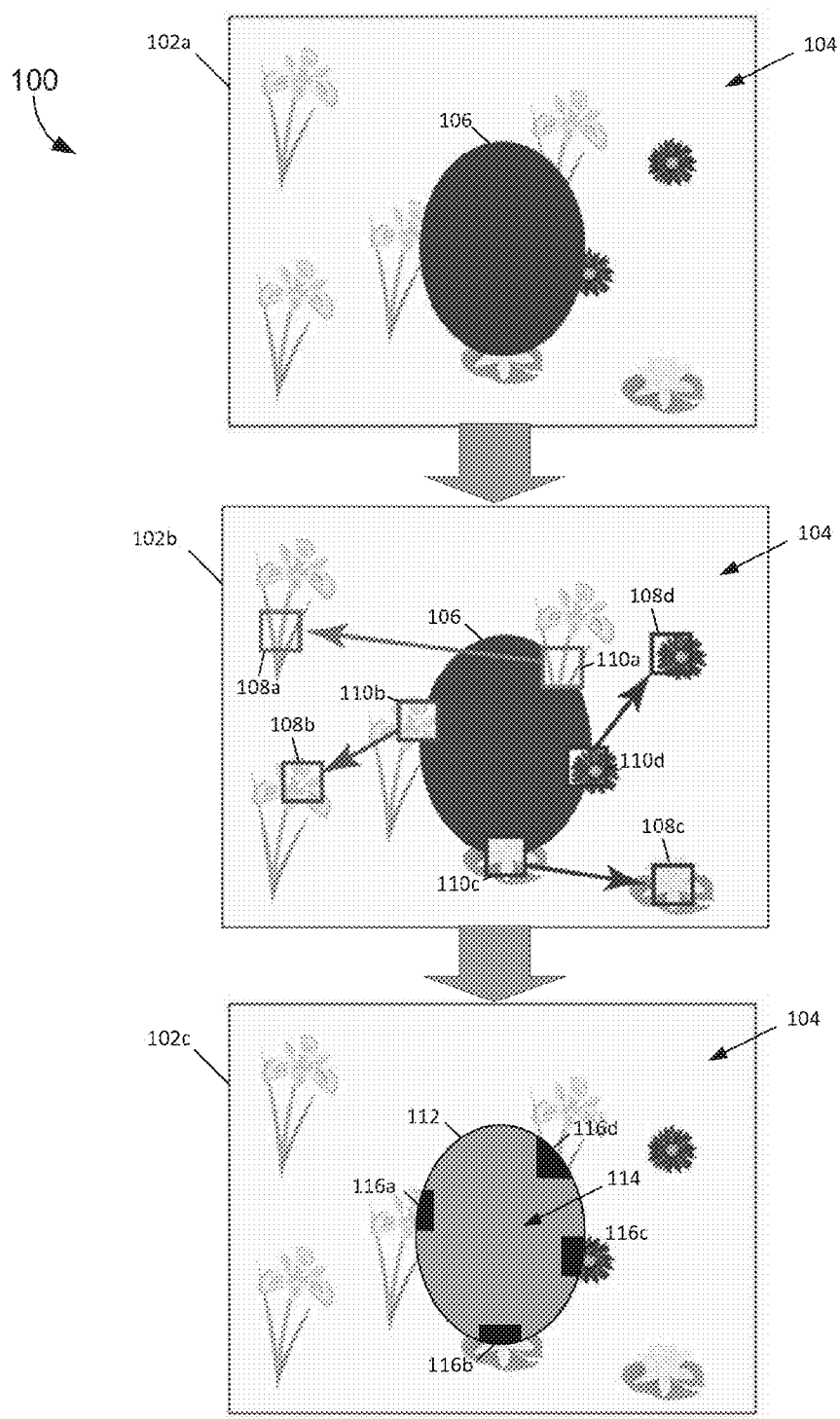
FIG. 1 illustrates a visual sequence that represents a general overview of an example digital image editing technique, in accordance with various embodiments of the present disclosure.

Digital image editing techniques are oftentimes employed to modify a digital image to achieve a desired result. Some of these digital image editing techniques implement patch synthesis techniques, as mentioned above, that can be utilized to synthesize a region of the digital image. Such digital image editing techniques may include, for instance, image completion, image reshuffling, texture synthesis, image retargeting, image warping, image blending, texture interpolation, image harmonization, style transfer, texture by numbers, or any other digital image editing technique that utilizes patch synthesis techniques.

As an example of one of these digital image editing techniques, in some instances, an object may appear within the captured digital image that is undesirable (e.g., electrical transmission lines or poles, people, cars, etc.). In such instances, image completion may be used to fill in, or replace, the portion of the digital image that contains the undesirable object. To accomplish this image completion, a hole, created by removing the object from the digital image, can be filled utilizing a patch synthesis technique to find one or more corresponding portions of the digital image, or a separate digital image. These corresponding portions can be utilized by the patch synthesis technique in filling the hole. Such a patch synthesis technique may include searching the image for source patches that correspond with portions of the image that lie within the hole. Once corresponding portions have been found, the hole can begin to be filled through a voting process that determines a color of each pixel within the hole utilizing these corresponding portions. This process can be repeated many times to progressively find better corresponding portions and thereby result in a better fill for the hole. In each of these iterations of the patch synthesis technique, all pixels within the hole are individually processed. This is the case even if an individual pixel has converged, or reached a state where no better color for the pixel can be found. As such, under the current state of the art, a substantial amount of unnecessary processing occurs in these patch synthesis techniques for pixels that gain no benefit from further processing by these patch synthesis techniques. This issue is magnified in later stages of the patch synthesis technique where a relatively large number of pixels may have converged and a relatively small number of pixels will still benefit from additional processing.

Embodiments of the present invention are generally directed towards generating and/or utilizing an active mask to limit the processing of pixels within a target region (e.g., the hole described above) to those pixels that have yet to converge. The active mask is utilized to differentiate between those pixels within the target region that are still active, or have yet to converge, and those pixels within the target region that are no longer active, or have converged. Utilizing such an active mask in one or more iterations of the patch synthesis technique can limit the processing of pixels that lie within the target region to only those pixels that are differentiated as active within the active mask. In doing this, the processing that would have been applied, under the current state of the art, to those pixels that have converged is skipped, which can save a great deal of processing time and resources.

In embodiments, an active mask can be generated by identifying groupings of pixels, which have been determined to have converged, as inactive. Identifying groupings of pixels that have converged can, in some embodiments, be based on a coherency analysis, such as that discussed extensively below. The remainder of such an active mask would identify those pixels that have yet to converge and are therefore still active. The patch synthesis technique described herein can be configured to take advantage of such an active mask and no longer process those groupings of pixels that are identified within the active mask as being inactive.

FIG. 1 illustrates a sequence 100 that represents a broad general overview of an example digital image editing technique, in accordance with various embodiments of the present disclosure. It will be appreciated that, because the intent of sequence 100 is to provide a broad general overview, many specific details are omitted from this discussion. These specific details, however, are discussed in reference to the remaining figures.

As depicted, sequence 100 begins at 102a with digital image 104. Digital image 104 represents an image that is stored in a digital format. Such a digital format could be, for example, a Joint Photographic Experts Group (JPEG) format, a Bitmap (BMP) format, a Tagged Image File Format (TIFF), a Portable Networks Graphic (PNG) format, A Graphics Interchange Format (GIF), or any other suitable format. Digital image 104 includes target region 106. As used herein, a target region of a digital image refers to a region of the digital image that is to be replaced with a region that has been synthesized through a patch synthesis technique. As depicted, target region 106 depicts an area of digital image 104 that is be filled utilizing portions of the remainder of digital image 104 as the source. As such, the area outside of target region 106 can be referred to herein as a source region. It will be appreciated that, in other embodiments, the source region could be one or more additional digital images.

Target region 106 can be filled with a synthesized region that is generated utilizing a patch synthesis technique, such as those described extensively herein, that can identify patches within the source region that correspond with patches in the target region. As used herein, a patch can refer to a section, or grouping, of pixels in a digital image. This section may be of fixed or varying shape. For example, a patch may be defined as a fixed shape 5×5 or 7×7, where the dimensions indicate the number of pixels covered by the patch (e.g., a 7×7 patch covers an area of 7×7 pixels, or a total of 49 pixels). Each patch can be centered at a single pixel and can overlap patches centered at neighboring pixels. Thus each pixel can be covered by a number of overlapping patches. For example, considering a patch of dimensions 7×7, each pixel would be covered by a total of 49 overlapping patches.

Moving to 102b, an iterative search process of a patch synthesis technique has been performed to identify source patches 108a-108d from the source region that correspond with target patches 110a-110d. In some embodiments, this iterative search process is a repeated search of all patches in one image region (e.g., source region) to find the most similar patch to another image region (e.g., target region 106). This most similar patch can be referred to in the art as a nearest neighbor, or approximate nearest neighbor. The similarity of patches can be compared utilizing any patch distance metric, such as, for example, $L_p$. Additional details of such a search process are discussed in reference to FIGS. 2-4 and 6, below. Once source patches 108a-108d have been identified, the target region 106 can begin to be filled through a voting process of the patch synthesis technique. Such a voting process can be utilized to determine colors for pixels that lie within target region 106 utilizing source patches 108a-108d. As depicted, the source patches 108a-108d found by searching the source region of digital image 104 are ideal source patches that may not be able to be improved upon in any further iterations of the patch synthesis technique being applied. As such, these portions of target region 106 can be considered to have converged and, consequently, will not benefit from any further processing of the patch synthesis technique. However, the patch synthesis technique would continue through many additional iterations in order to generate a synthesized region that can fill target region 106. In each of these iterations, under the current state of the art, the portions of target region that have converged would again be processed through the searching and voting processes of the patch synthesis technique, although no change would occur to these converged portions.

In an effort to prevent at least some of this repetitive processing of these converged portions in the patch synthesis technique, at 102c an active mask 112 is generated. Active mask 112 identifies groupings of pixels that have been determined to have converged as inactive regions 116a-116d. Determining pixels that have converged is discussed in greater detail below, in reference to FIGS. 2, 3, and 5. The remainder of active mask 112 identifies active region 114. The patch synthesis technique can be configured to take advantage of active mask 112 and no longer process those groupings of pixels that are identified within active mask 112 as lying within inactive regions 116a-116d. It will be appreciated that, as the patch synthesis technique proceeds, the groupings of pixels that have been determined to have converged will continue to grow. As such, as the patch synthesis technique continues, the active mask can be continually updated to reflect this growth. Consequently, the impact of the active mask on processing speed and resources in later iterations of the patch synthesis technique may be magnified.

Figure 2:
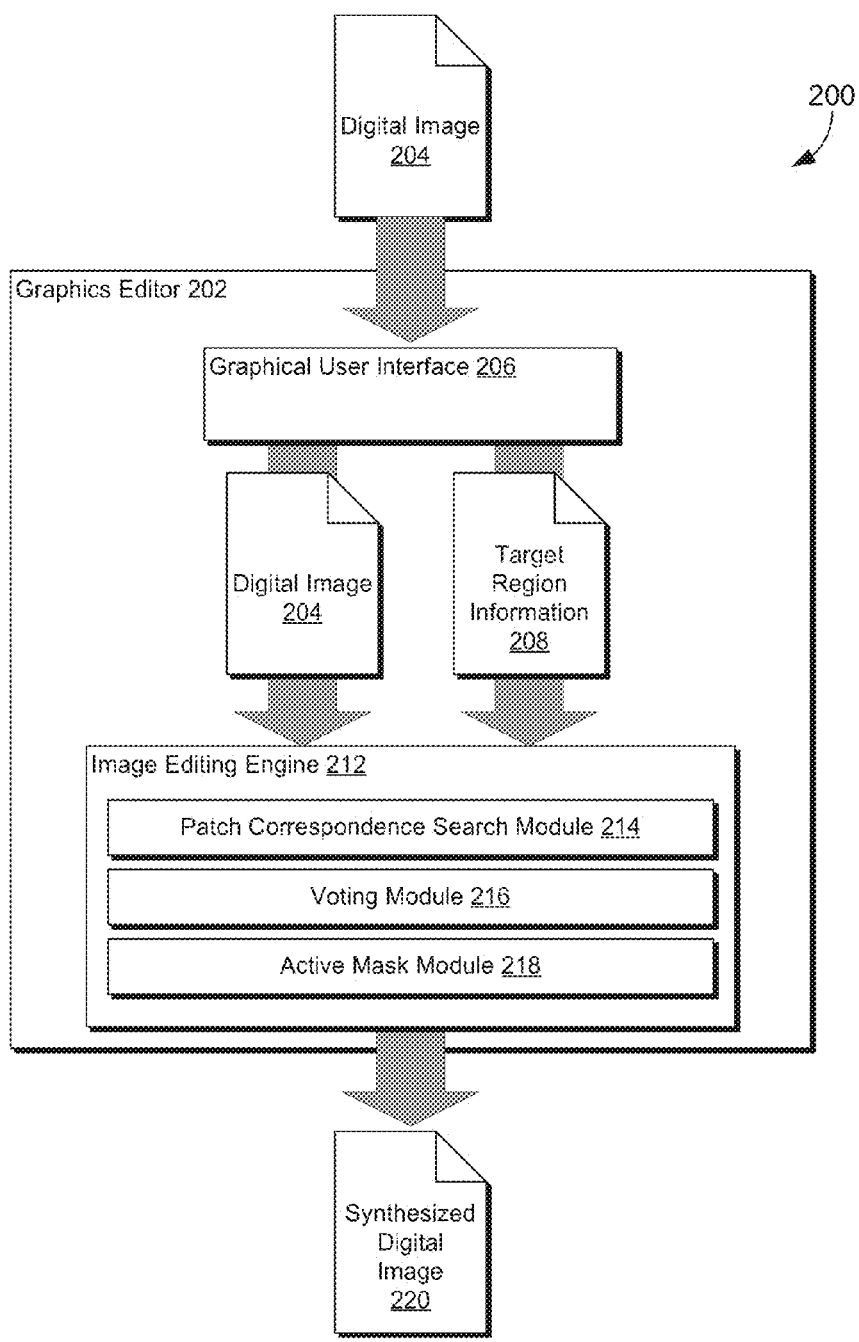
FIG. 2 depicts aspects of an illustrative graphics editing environment, in accordance with various embodiments of the present disclosure.

FIG. 2 depicts aspects of an illustrative graphics editing environment 200 in accordance with various embodiments of the present disclosure. As depicted, graphics editing environment 200 includes a graphics editor 202. Graphics editor 202 can be any suitable graphics editor, such as, for example, ADOBE® Illustrator or ADOBE® Photoshop (both available from Adobe Systems Inc. of San Jose, Calif.). Graphics editor 202 can be configured to provide, among other things, a user interface that facilitates a user of graphics editor 202 in manipulating a digital image, such as, for example, digital image 204.

Digital image 204 represents an image that is stored in a digital format (e.g., JPEG, BMP, TIFF, PNG, GIF, etc.). Digital image 204 can be stored digitally as a two-dimensional array of pixels that depict the object or scene captured by the digital image. Each of these pixels is assigned certain information, such as, for instance, color information. For example, in some embodiments, each pixel is assigned a value in the red, green, blue (RGB) color domain. The RGB color domain, also referred to in the art as the RGB color model, is an additive representation of a color. In the RGB color domain, each pixel would be assigned a color by assigning an amount of red, green, and blue to the respective pixel, hereinafter referred to as an RGB color value. The combination of this RGB color value would represent the color of the pixel within the digital image. It will be appreciated that the RGB color domain is merely meant to be an example of a possible color domain and that the teachings of this disclosure could be applied to any color domain, or representation of color, without departing from the scope of this disclosure. In various embodiments, digital image 204 can be produced, or captured, by a digital image capture device. Such a digital image capture device could be, for example, a document scanner, a digital camera (video or still), or any other suitable digital image capture device. In other embodiments, digital image 204 may be produced entirely in the digital realm (e.g., computer generated imagery (CGI)).

Graphics editor 202 includes a graphical user interface (GUI) 206. In embodiments, GUI 206 is configured to facilitate a user of graphics editor 202 in performing digital image editing techniques on digital image 204. To accomplish this, GUI 206 can be configured to display digital image 204 to the user and to accept input from the user with respect to the digital image. In embodiments, this input could be selection of a target region that the user would like to replace with a synthesized region that is assembled from a source region. GUI 206 could utilize this input to generate target region information 208 that can be utilized to identify the target region with respect to digital image 204. As an example, the user may utilize GUI 206, in conjunction with an input device (e.g., touch sensors, stylus, mouse, etc.), to identify an object that the user would like to remove from digital image 204 utilizing an image completion process or to identify a portion of digital image 204 that the user would like to move to another location within the digital image utilizing an image reshuffling process. In some embodiments, target region information 208 could take the form of a mask that can be utilized to identify the selected target region within the digital image 204. In other embodiments, target region information 208 could take the form of a series of coordinates (e.g., corner coordinates of a bounding box, or coordinates for each pixel in the target region) that can be utilized to identify the selected target region within digital image 204. It will be appreciated that these embodiments of target region information 208 are merely meant to be illustrative of possible mechanisms for identifying the selected target region within digital image 204 and that any other mechanism capable of identifying the target region could be utilized without departing from the scope of this disclosure.

To accomplish the digital image editing techniques, graphics editor 202 includes image editing engine 212. Image editing engine 212 can take digital image 204 and the target region information 208 as input. In embodiments, image editing engine 212 can include a patch correspondence search module 214, a voting module 216, and an active mask module 218. In embodiments, these modules may work in conjunction to iteratively perform a patch synthesis technique as described herein.

Patch correspondence search module 214 can be configured to perform an iterative search to find, for each patch in the target region (e.g., target patches 110a-110d of FIG. 1), the closest, or most similar, patch (e.g., source patches 108a-108d of FIG. 1) within a source region in digital image 204. In embodiments, this iterative search can take the form of an approximate nearest-neighbor search. Examples of approximate nearest neighbor searches include, patch matching based searches (e.g., PatchMatch), hashing based searches (e.g., coherency sensitive hashing (CSH)), tree based searches (e.g., kd-tree), or any other suitable approximate nearest-neighbor search. The result of an approximate nearest-neighbor search can be recorded in a map called a nearest-neighbor field (NNF). A nearest-neighbor field can be considered a mapping from a set of patches A in the target region to a set of patches B in the source region. This mapping can be represented by f:A→B. In some embodiments, the nearest-neighbor field can be stored (e.g., in a buffer or other suitable medium) as a set of coordinates. For instance, a notation can be used such that a patch P1 in the source region is defined as P1=S(i,j), where 'i' and 'j' reflect, for example, the coordinates of the upper left corner of patch P in the source region, S. Utilizing this notation, a patch P2 in the target region can be similarly defined as P2=T(k,l). In such a notation, an offset between patches S(i,j) and T(k,l) can be defined as (k−i, l−j). In other embodiments, merely the offset may be stored in the nearest-neighbor field.

An approximate nearest-neighbor search is an iterative optimization search that seeks to optimize, or minimize, an energy function of the nearest-neighbor field. Such an energy function, 'E,' can be expressed by the equation $E=\Sigma D(a,NN(a))$, $\forall a \in A$, where 'D' represents a distance function (e.g., $L_2$ distance, $L_p$ distance, etc.), 'a' represents a patch in the set of patches A, and NN(a) can be represented by the equation argmin D(a,b), $\forall b \in B$, where 'D' again represents the distance function, 'b' represents a patch in the set of patches B, and argmin represents the argument of the minimum concept in mathematics. As such, an approximate nearest-neighbor search seeks to find a set of source patches B that has total minimum distance from the corresponding set of target patches in A.

Figure 6A:
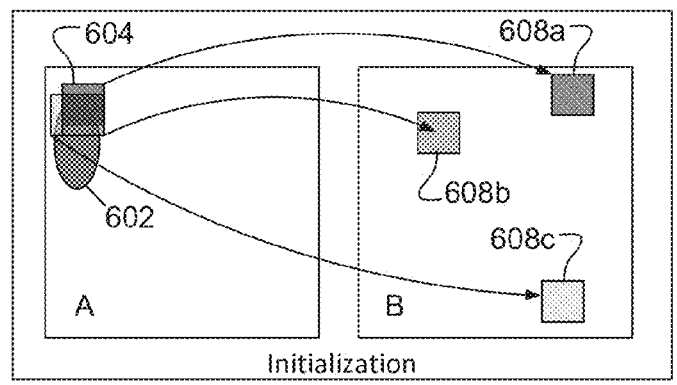
FIGS. 6A through 6C show illustrative examples of a search process performed as part of a patch synthesis technique, in accordance with various embodiments of the present disclosure.
Figure 6B:
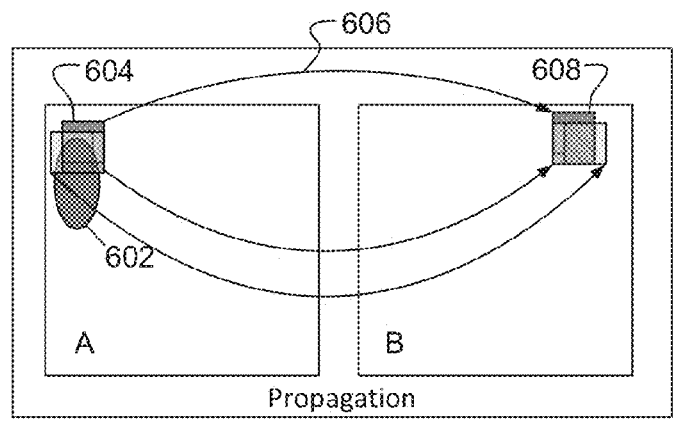
Figure 6C:
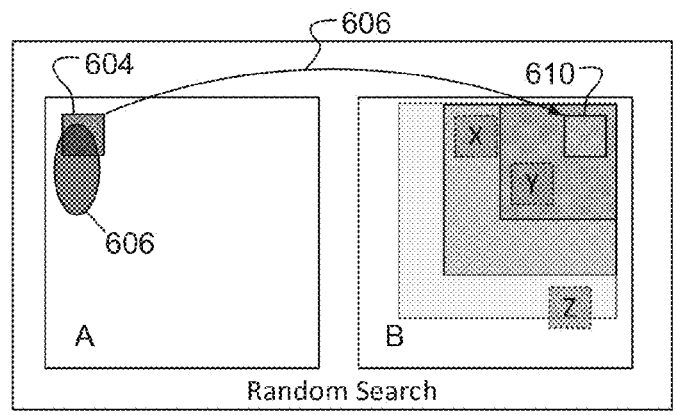

To accomplish the optimization of the energy function discussed above, the approximate nearest-neighbor search may, in some embodiments, begin with an initial population of the nearest-neighbor field. This initial population could be randomly assigned, derived from a nearest-neighbor field from a previous iteration, or otherwise populated with an initial starting point for the approximate nearest-neighbor search. A random initial population is depicted in FIG. 6A. In embodiments, where the nearest-neighbor field is initially populated, an iterative search can be conducted to find a set of patches within the source region that improves upon the initial population of the nearest neighbor field. In some embodiments, this iterative search can have two phases. The first phase being a propagation phase, or linear search phase, in which good solutions (e.g., source patches and respective target patches having a relatively small distance) for neighboring pixels in the target region can be disseminated through a linear search (e.g., scanline order or reverse scanline order). Such a propagation phase is depicted in FIG. 6B. The second phase is a random search phase in which a random patch search can be performed in concentric neighborhoods across the source region to determine if any of these random source patches have a smaller distance than the currently selected source patch. This random phase can be beneficial to prevent the approximate nearest-neighbor search from getting stuck in minima. Such a random phase is depicted in FIG. 6C.

Once a set of source patches B has been found via the approximate nearest neighbor search, these patches can be passed to voting module 216. Voting module 216 can be configured to take the source patches B and utilize these patches to determine a color for each pixel in the target region. This can be accomplished through a blending operation that takes into account the patches that overlap a single pixel to assign a color to that single pixel. The computational cost of this blending operation can be represented by the equation $N^2*K$, where N is the dimension of the patches, assuming uniform square dimensions, while K represents the number of pixels of the target region. In some embodiments, this blending operation could be a weighted blending operation in which a weighted sum of all the overlapping patches from the nearest-neighbor field is utilized to arrive at a final color for each pixel.

The above discussed patch correspondence search module 214 and voting module 216 can be utilized to iteratively refine the nearest-neighbor field to better approximate estimated colors of the of the target region. In some embodiments, this can be accomplished in a multi-resolution manner. As such, digital image 204 may first be downsampled from an original resolution to a predefined resolution prior to being processed by patch correspondence search module 214 and voting module 216. After a sufficient number of iterations have been performed at this downsampled resolution, the digital image 204 can be upsampled to a next scale and the processing can be repeated, until ultimately digital image 204 is upsampled to meet the original resolution again.

If an area of the target region gets reconstructed by source patches that are coherent, the values of corresponding pixels for the target region will be substantially the same as pixels of the source patches, except at boundaries where different coherent source patches may overlap. As used herein, coherency of a patch means that a shift in the nearest-neighbor field (e.g., offset) corresponds to an equal shift in the source region. For instance, assume (x,y) is a coordinate of a first target patch that is being synthesized and (x',y') is a coordinate of a first source patch that corresponds with the first target patch in the nearest-neighbor field. That is to say that, (x',y') is the coordinate of the best source patch that has been found for the first target patch so far. If a second target patch is indicated by coordinate (x+1, y) and corresponds to a second source patch indicated by the coordinate (x'+1, y), then the first target patch and the second target patch are considered to be coherent. This property of nearest-neighbor fields is often observed in ground truth nearest neighbor fields. As a side effect, the approximate nearest-neighbor fields returned by patch correspondence search module 214 may include large coherent regions having the same nearest-neighbor field offsets. Thus, reconstructed regions can often be formed from big coherent regions. In some instances, these coherent regions can cover a large percentage of the synthesized region at higher resolutions (e.g., later iterations of processing). As mentioned above, the approximate nearest-neighbor search implemented by patch correspondence search module 214 is an iterative optimization search, in which each iteration tries to find a better source patch match for each target patch (e.g., lower distance). However, in an ideal coherent region the patches match exactly and the patch distance is typically zero, so no better patch can be found. As such, these coherent regions, or the pixels therein, can be considered to have converged. Therefore, the patch synthesis technique discussed above can be accelerated by skipping the coherent regions in the processing performed by patch correspondence search module 214 and/or voting module 216. The gain gets larger at the last few finer scales where most of the algorithm time is spent.

Active mask module 218 can be configured to generate an active mask that identifies those pixels within a target region that have yet to converge and are still active and those pixels within the target region that have converged and are no longer active. In some embodiments, the active mask can be stored in the form of a binary two dimensional array that stores either a '1' or a '0' value for each pixel within the synthesized target region. The '1' and the '0' value can be utilized to distinguish between those pixels that are still active within the target region and those pixels that are inactive within the target region. For example, a value of '0' at coordinate (c,d) within the active mask could indicate that the pixel at a corresponding location within the target region is still active, while a '1' at coordinate (e,f) within the active mask could indicate that the pixel at a corresponding location within the target region is inactive. It will be appreciated that these values can also be reversed, where '0' indicates active and '1' indicates inactive, without changing the effect of the active mask. It will also be appreciated that the binary mask is merely meant to be an illustrative example and should not be treated as limiting of this disclosure. Any other mechanism suitable for distinguishing between active pixels and inactive pixels is expressly contemplated herein.

To generate the active mask, active mask module 218 can be configured to identify, as inactive regions, groupings of pixels within the target region that have converged. In some embodiments, to identify these groupings of pixels within the target region that have converged, active mask module 218 can be configured to perform a coherency analysis on the nearest-neighbor fields that were produced by the patch correspondence search module 214. For instance, in one embodiment, for a coordinate (x,y) in the target region, the neighbors' nearest neighbor field coherency can be evaluated to determine whether the pixel at location (x,y) in the target region is active or inactive. For example, in some embodiments, the diagonal neighbors' (e.g., (x−1, y−1), (x+1, y−1), (x−1, y+1), and (x+1, y+1)) nearest neighbor field coherency can be evaluated as depicted in the pseudo-code presented below in Algorithm 1. As can be seen in the illustrative pseudocode of Algorithm 1, below, if the number of coherent neighbors is 3 or greater, then the pixel at coordinate (x,y) is marked as inactive, otherwise, the pixel at coordinate (x,y) is marked as active. It will be appreciated that the activeThreshold value of 3 from Algorithm 1 is merely meant to be illustrative and should not be treated as limiting. As another example, in some embodiments, the immediately adjacent neighbors' (e.g., (x+1, y), (x−1, y), (x, y+1), and (x, y−1)) nearest neighbor field coherency can be evaluated in a similar manner to that described above. As another example, in some embodiments, the immediately adjacent neighbors' and the diagonal neighbors' nearest neighbor field coherencies can be evaluated in conjunction in a similar manner to that described above. It will be appreciated that the above examples are merely meant to be illustrative. There are numerous ways to establish whether a pixel is active or inactive, and this disclosure should not be limited based on the manner in which a pixel is determined to be active or inactive.

| Algorithm 1 - Active Mask Method |
| --- |
| 1.  coherentCount = 0
2.  activeThreshold = 3
3.  activePixel = 1
4.  inactivePixel = 0
5.  coherentCount = (NNF [x−1, y−1] == NNF[x,y] + (−1, −1))
6.  coherentCount += (NNF[x+1, y−1] == NNF[x,y] + (+1, −1))
7.  coherentCount += (NNF[x−1, y+1] == NNF[x,y] + (−1, +1))
8.  coherentCount += (NNF[x+1, y+1] == NNF[x,y] + (+1, +1))
9.  if coherentCount >= activeThreshold then
10.     activeMask[x,y] = inactivePixel
11. else
12.     activeMask[x,y] = activePixel
13. end if |

In some embodiments, active mask module 218 can be further configured to erode the inactive regions, or dilate the active regions, by marking those pixels at the edge of the inactive regions within the active mask as active. In such embodiments, the size of the patch of the patch synthesis technique can be utilized to determine the distance in pixels to erode from the edge. This can account for instances where boundaries of different coherent source patches may overlap. For example, consider a patch width of 7. A patch whose all 49 (e.g., 7×7) pixels are coherent with their four neighbors (e.g., diagonal or immediately adjacent) is an exact replica of its nearest neighbor patch in the source image (e.g., distance=0). Such a patch should not change anymore and thus the entire patch can be declared inactive and the searching process for this patch and the voting process for this patch's pixel colors can stop. On the contrary, in such an example, any patch that touches an active pixel at a distance of 3 pixels, or approximately ½ of the patch width, cannot be guaranteed to have fully converged yet and might still change in the next iteration of the patch synthesis technique. As a result, the inactive regions within the active mask can be eroded by 3 pixels in an effort to better define the inactive regions within the active mask and this active mask can be utilized for the next search and/or vote steps.

The active mask generated by active mask module 218 need not be limited to the translation domain. As utilized herein, the translation domain refers to patches that have not been manipulated (e.g., via rotation, reflection, scale, perspective, etc.). Translation is a term commonly used in geometry to describe a function that moves an object a certain distance. In the context of the approximate nearest neighbor searching discussed herein, translation specifically refers to searching for a new candidate that is some horizontal and vertical distance from a given point. The active mask can be equally applied to the transformation domain where patches have been manipulated in some manner. However, it will be appreciated that, where the active mask is applied to the transformation domain a like transformation would be applied to the above discussed coherency analysis. For example, if a source patch has been rotated 90 degrees then the above discussed coherency analysis would also need to be rotated 90 degrees.

Once the active mask has been generated, it can be utilized by image editing engine 212, patch correspondence search module 214, and/or voting module 216 to limit further processing of the inactive pixels identified by the active mask and thereby reduce the number of computations performed in the patch synthesis technique. As such, each of these components can be configured to utilize the active mask in the processing described above with respect to each of these components. In some embodiments, the active mask could be utilized to prevent voting on those pixels that are indicated as inactive by the active mask. In other embodiments, an active mask from a previous iteration of the patch synthesis technique can be utilized to limit the approximate nearest-neighbor searching being performed. In still other embodiments, an active mask can even be upsampled to be utilized in as an initial active mask for the next scale up. Such a scenario is discussed in greater detail in reference to block 420 of FIG. 4, below. In some embodiments, the active mask can be generated for every iteration at every scale of the patch synthesis technique. In other embodiments, the active mask can be utilized for specific iterations within the patch synthesis technique. For example, as mentioned earlier, the gain realized by utilizing the active mask to limit further processing of inactive pixels gets larger at the last few finer scales where most of the processing time is spent. As such, the active mask could only be utilized in these last few finer scales.

Once the image editing engine 212 has completed the image editing technique, the resulting synthesized digital image 220 can be output (e.g., to a display, printer, etc.). Some non-limiting examples that can benefit from a the technique described herein utilizing and active mask to reduce processing include: image completion, image reshuffling, image texture synthesis, image retargeting, image warping, image blending, image texture interpolation, image harmonization, image style transfer, texture by numbers, or any other digital image editing technique that manipulate a nearest neighbor field. It will be appreciated that, while the above discussions concentrated on digital image editing techniques, that the embodiments discussed herein could also be extended to space time to be applied to video applications as well. As such, the embodiments discussed herein could be extended to video completion, video reshuffling, video retargeting, video warping, video blending, video texture interpolation, video harmonization, video style transfer, video texture by numbers, or any other video editing process that involves manipulation of a nearest neighbor field. Extension of the descriptions herein to these video editing techniques will be readily understood by one of ordinary skill in the art.

Figure 3:
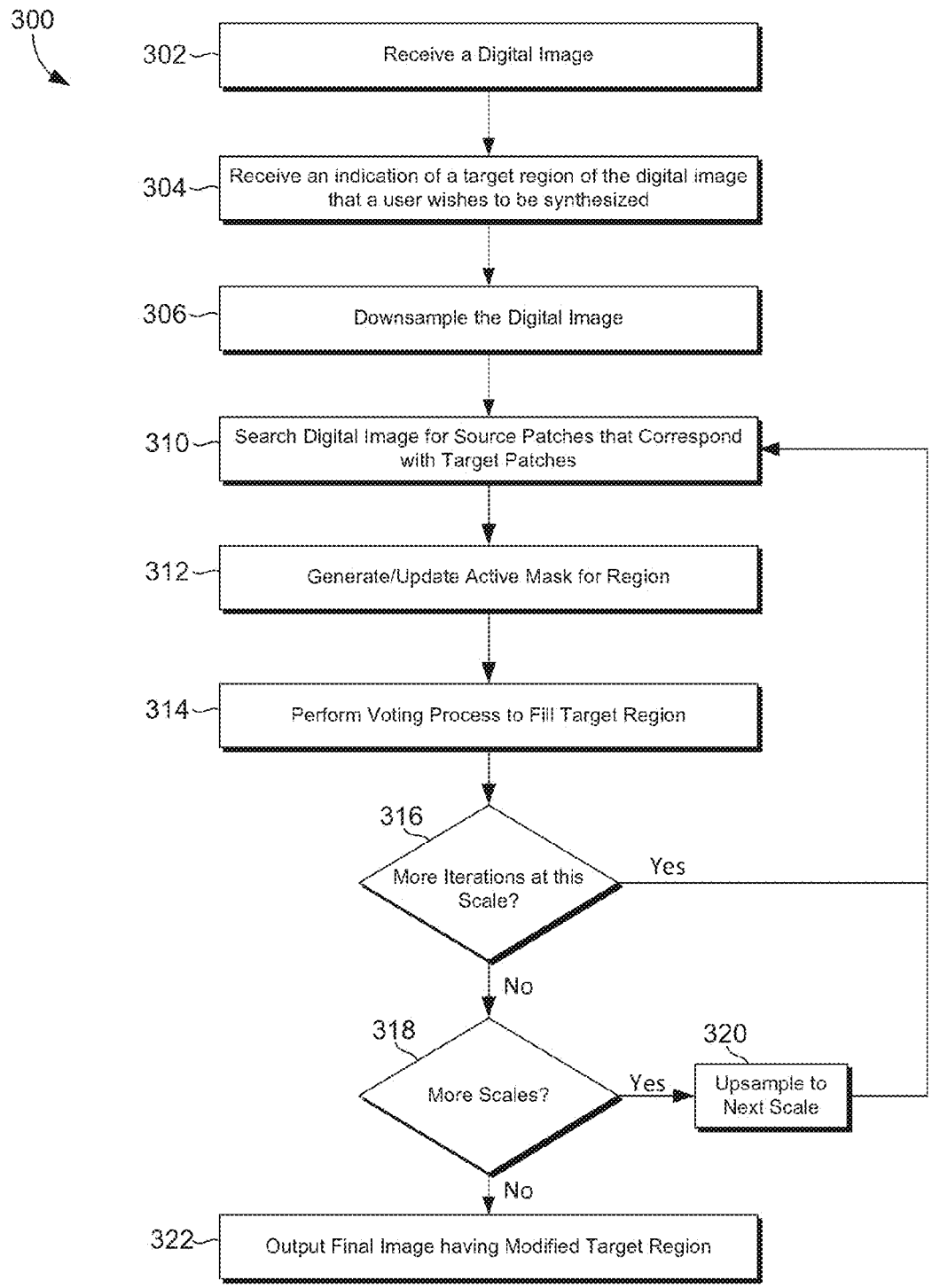
FIG. 3 illustrates a process flow depicting an example patch synthesis technique, in accordance with various embodiments of the present disclosure.

FIG. 3 illustrates a process flow 300 depicting an example patch synthesis technique, in accordance with various embodiments of the present disclosure. Process flow 300 could be carried out, for example by graphics editor 202 of FIG. 2. As depicted, process flow 300 can begin at block 302 where a digital image (e.g., digital image 204 of FIG. 2) is received. At block 304, an indication of a target region of the digital image that a user wishes to be synthesized can also be received. In embodiments, such an indication could be a selection of a target region (e.g., via GUI 206 of FIG. 2) that the user would like to be synthesized from a source region. As an example, the user could identify an object that the user would like to remove from the digital image utilizing an image completion process or identify a portion of the digital image that the user would like to move to another location within the digital image utilizing an image reshuffling process.

In some embodiments, the patch synthesis technique can be performed in a multi-resolution manner. In such a multi-resolution manner, the processing may begin with a low resolution image and can increase the resolution throughout the patch synthesis technique until an original resolution of the digital image is achieved. As such, at block 306, the resolution of the digital image can be downsampled from an original resolution to a predefined resolution in anticipation of further processing.

An iterative search can be performed at block 310 to find, for each target patch in the selected target region (e.g., target patches 110a-110d of FIG. 1), the closest, or most similar, source patches (e.g., source patches 108a-108d of FIG. 1) within a source region of the digital image. In embodiments, this iterative search can take the form of an approximate nearest-neighbor search discussed in detail in reference to FIGS. 2 and 4.

At block 312, an active mask can be generated, or updated, based on the results of the iterative search. As discussed previously, an active mask distinguishes between those pixels within a target region that have yet to converge and therefore are still active and those pixels within the target region that have converged and therefore are no longer active. To generate the active mask, pixels within the target region can be analyzed to determine groupings of pixels that have converged (e.g., via the coherency analysis discussed in reference to FIG. 1, above). It will be appreciated that an active mask need not be produced, or updated, with every iteration of process flow 300. As such, block 312 can be skipped or omitted for some iterations and implemented for others. Generation of an active mask is discussed extensively in reference to FIGS. 1 and 5.

Based on the results of the iterative search, a voting process can be performed at block 314 to determine a color for each pixel in the target region. This can be accomplished through a blending operation that takes into account the source patches that overlap each pixel to assign a color to each single pixel. In some embodiments, this blending operation could be a weighted blending operation in which a weighted sum of all the overlapping patches from the nearest-neighbor field is utilized to arrive at a final color for each pixel. In iterations where an active mask was generated at block 312, the voting process can also take into account those pixels that are indicated as inactive by the active mask. As such, the voting process would ignore those pixels within the target region that are indicated as inactive by the active mask, thereby eliminating the processing cost associated with those inactive pixels.

At block 316, if there are more iterations to be performed at the current scale, then the process returns to block 310 where the above described process is repeated. In some embodiments, where an active mask has been generated at one iteration, that active mask may be utilized at block 310 in the next iteration. In such embodiments the iterative search process performed at block 310 would ignore those pixels within the target region that are indicated as inactive by the active mask, thereby eliminating the processing cost associated with those inactive pixels If, on the other hand, there are no more iterations to be performed at the current scale then the process proceeds from block 316 to block 318. At block 318, if there are more scales to be processed, then the process proceeds to block 320 where the digital image is upsampled to the next scale. In some embodiments, the active mask can also be upsampled at block 320. In such an embodiment, the most recent iteration's nearest-neighbor field is upsampled. This can be a delicate process since an invalid pixel may be the result of source/target mapping. However, to gain additional benefit from the active mask it may be desirable to maintain the ability to start with an existing active mask for the first iteration as we move from one scale to the next scale. This could be especially important for the last few scales, where the bulk of computational budget may be spent. As such, the current nearest-neighbor field can be upsampled and an new, or updated, active mask can be generated from this upsampled nearest-neighbor field. It will also be appreciated that the active mask from the current scale can be utilized to reduce the processing that occurs in upsampling the image to the next scale. Once the digital image is upsampled, the processing returns to block 310. If there are no more scales to be processed, then the processing can proceed to block 322 where a final image having a modified, or synthesized, target region can be output (e.g., to a display, printer, etc.).

Figure 4:
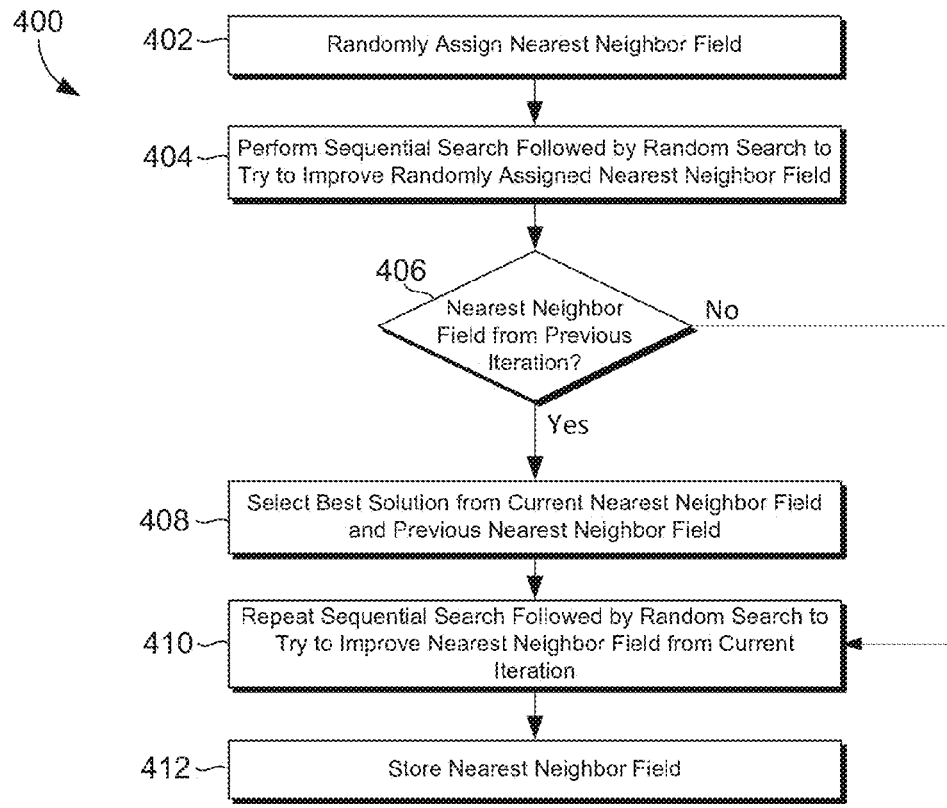
FIG. 4 illustrates a process flow depicting an example approximate nearest-neighbor search, in accordance with various embodiments of the present disclosure.

FIG. 4 illustrates a process flow 400 depicting an example approximate nearest-neighbor search to find to find a set of source patches from a source region that has minimum possible distance from a corresponding set of target patches for target region, in accordance with various embodiments of the present disclosure. Process flow 400 could be carried out, for example, by patch correspondence search module 214 of FIG. 2. As depicted, process flow 400 can begin at block 402 where, in the depicted embodiment, the nearest-neighbor field is initially populated in a random manner. In other embodiments, this initial population could be derived from a nearest-neighbor field from a previous iteration (e.g., of process 300 of FIG. 3), or otherwise populated with an initial starting point for the approximate nearest-neighbor search. A random initial population is depicted in FIG. 6A. From this initial population of the nearest-neighbor field, at block 404 an iterative search can be conducted to find a set of patches within the source region that improves upon the initial population of the nearest neighbor field. In some embodiments, this iterative search can have two phases. The first phase being a propagation phase, or linear search phase, in which good solutions (e.g., source patches and respective target patches having a relatively small distance) for neighboring pixels in the target region can be disseminated through a linear search (e.g., scanline order or reverse scanline order). Such a propagation phase is depicted in FIG. 6B. The second phase is a random search phase in which a random patch search can be performed in concentric neighborhoods across the source region to determine if any of these random source patches have a smaller distance than the currently selected source patch. This random phase can be beneficial to prevent the approximate nearest-neighbor search from getting stuck in minima. Such a random phase is depicted in FIG. 6C.

At block 406 a determination is made as to whether a nearest neighbor field is available from a previous iteration. If a nearest neighbor field is not available from a previous iteration, then the processing proceeds to block 410 where the nearest-neighbor field produced at block 404 is stored. If, on the other hand, a nearest neighbor field is available from a previous iteration, then the processing can proceed to block 408 where the mapping with the smaller distance from each location within the current nearest neighbor field and the previous nearest neighbor field is selected for each location within the nearest neighbor field. The processing can then proceed to block 410.

At block 410 the iterative search performed at block 404 can be repeated in an attempt to further refine the nearest-neighbor field. From block 410, the process flow can proceed to block 412 where the nearest neighbor field is stored. It will be appreciated that in process flow 400 each pixel within the target region is processed. As such, in embodiments where an active mask is available, process flow 400 can be configured to ignore processing of those pixels that are indicated by the active mask as being inactive, which can save processing time and speed up the approximate nearest-neighbor search.

Figure 5:
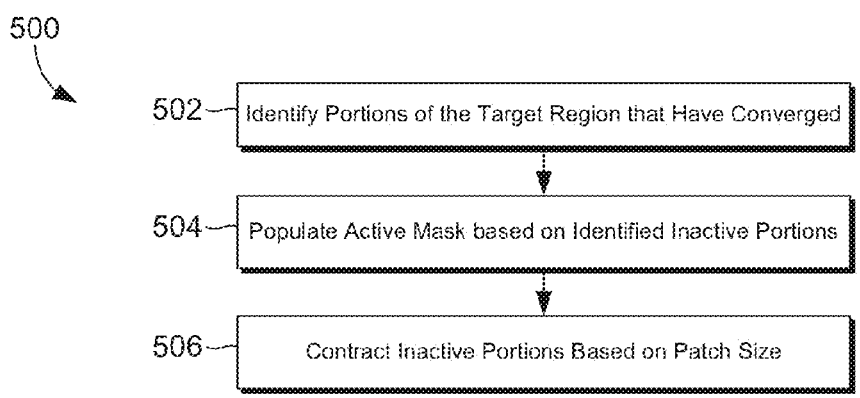
FIG. 5 illustrates a process flow depicting an example active mask generation, in accordance with various embodiments of the present disclosure.

FIG. 5 illustrates a process flow 500 depicting an example active mask generation for a target region, in accordance with various embodiments of the present disclosure. Process flow 500 could be carried out, for example, by active mask module 218 of FIG. 2. As depicted, process flow 500 can begin at block 502 where portions of the target region are identified as having converged. In some embodiments, to identify these portions of the target region that have converged, a coherency analysis, such as that discussed in reference to FIG. 1, can be performed on a nearest neighbor field of the target region.

At block 504, the active mask can be populated based on those portions of the target region that have been determined to have converged. In some embodiments, this could include populating a binary two dimensional array that stores either a '1' or a '0' value for each pixel within the target region. The '1' and the '0' value can be utilized to distinguish between those pixels that are still active within the target region and those pixels that are inactive within the target region. It will also be appreciated that the binary mask is merely meant to be an illustrative example and should not be treated as limiting of this disclosure. Any other mechanism suitable for distinguishing between active pixels and inactive pixels is expressly contemplated herein.

At block 506, the inactive regions of the active mask can be eroded by marking those pixels at the edge of the inactive regions within the active mask as active. In such embodiments, the size of a patch of a patch synthesis technique utilized in processing the target region can be utilized to determine the distance in pixels to erode from the edge. This can account for instances where boundaries of different coherent source patches may overlap. For example, consider a patch width of 7. A patch whose all 49 (e.g., 7×7) pixels are coherent with their four neighbors (e.g., diagonal or immediately adjacent) is guaranteed to be an exact replica of its nearest neighbor patch in the source image (e.g., distance=0). Such a patch should not change anymore and thus the entire patch can be declared inactive and further searching and/or voting processes for this patch can stop. On the contrary, in such an example, any patch that touches an active pixel at a distance of 3 pixels, or approximately ½ of the patch width, cannot be guaranteed to have fully converged yet and might still change in the next iteration of the patch synthesis technique. As a result, the inactive regions within the active mask can be eroded by 3 pixels in an effort to better define the inactive regions within the active mask and this active mask can be utilized for the next search and/or vote steps.

FIGS. 6A through 6C show illustrative examples of a search process performed as part of a patch synthesis technique, in accordance with various embodiments of the present disclosure. FIG. 6A depicts a random initialization phase of a search process for filling target region 602 of image A. As depicted in FIG. 6A the nearest-neighbor field for each of the target patches represented collectively by 604 has been randomly initialized to map to source patches 608a-c as indicated by the arrows connecting the various patches. These mappings can be improved in one or more iterations of an approximate nearest-neighbor search an example of which is depicted in FIGS. 6B and 6C.

In some implementations, a propagation phase can be carried out as illustrated in FIG. 6B. For example, assume that patches 604 in image A have each been mapped to patches 608 in image B as indicated by the arrows. Neighboring patches of each of patches 604 can now be evaluated to determine what mappings they have, and whether any of these mappings can be applied to any of patches 604 for a better result (e.g., smaller distance). In some implementations, an algorithm can look at the four immediately adjacent pixels, or all pixels in a circular or square neighborhood of a defined diameter (e.g., 2 or 4), and/or any subset of the pixels within a fixed distance of the pixel at which propagation occurs, to name just a few examples. The term propagation indicates that good mappings for one patch can be propagated to neighboring patches to improve their mappings. Thus, for example, if a local maxima of correspondence exists in mappings of a neighborhood around the patches 604, it can be detected in the propagation phase.

In some situations, the propagation phase may not find the globally best mapping and may get stuck in minima. A perturbation such as a random-search phase can therefore be used as schematically illustrated in FIG. 6C. Here, the individual patch represented by 604 is initially mapped to 610, for example resulting from the propagation phase depicted in FIG. 6C. One or more randomly selected patches can then be evaluated. For example, patches X, Y, and Z can be randomly selected in the image B. In some implementations, patches X-Z are selected to have gradually increasing or decreasing distance from the location of the original mapping target in the image B. For example, a random distribution can be used that includes nearby locations (e.g., patch Y) and locations further away (e.g., patch Z), wherein the distribution places more weight, via a distribution function, on distances of nearby locations than would be obtained from uniform sampling. The patches X-Z can be evaluated to determine whether any of these patches has a better correspondence (e.g., smaller distance) with patch 604.

Figure 7:
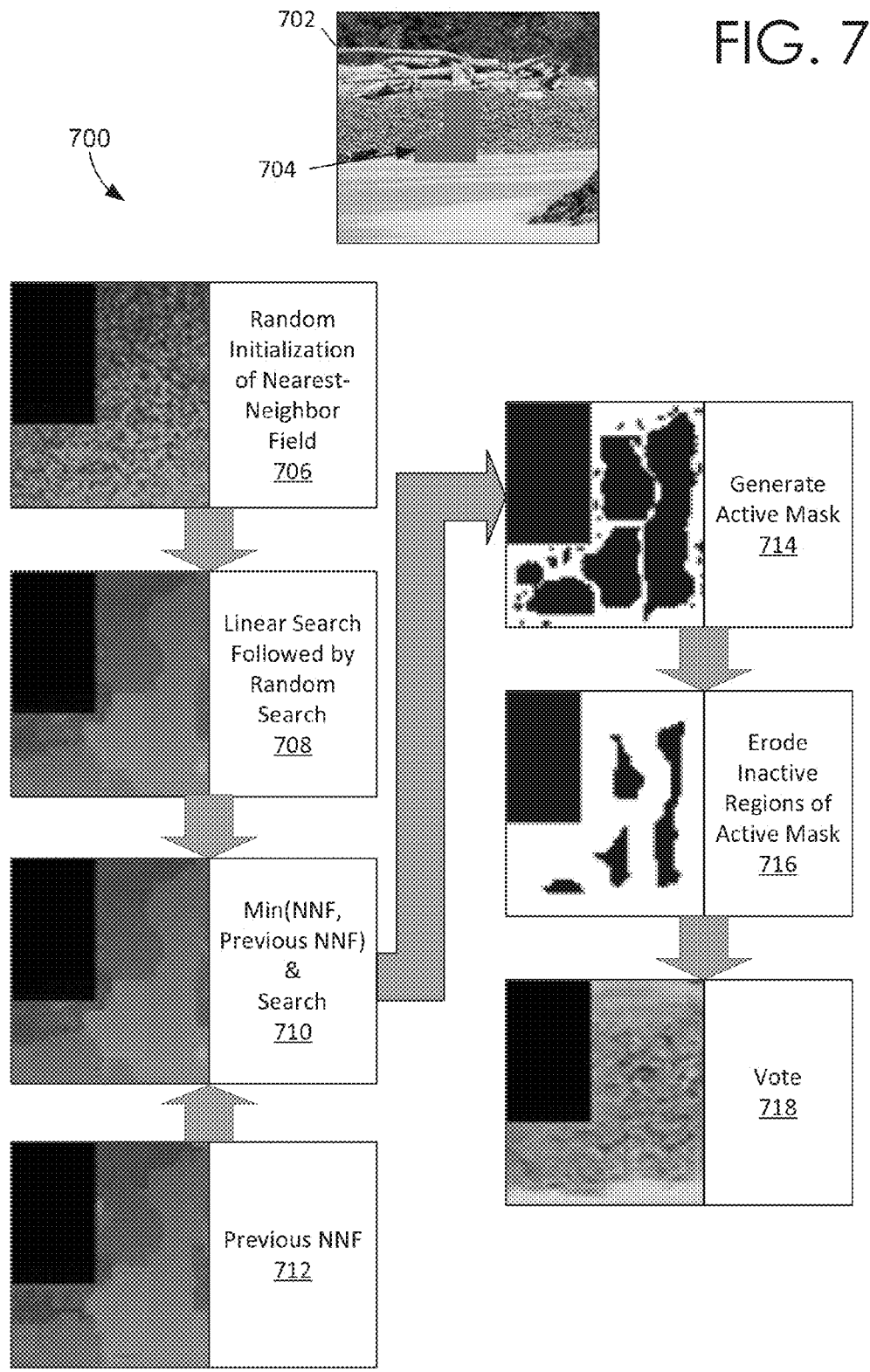
FIG. 7 is a visual depiction of aspects of one iteration of a patch synthesis technique, in accordance with various embodiments of the present invention.

FIG. 7 is a visual depiction of aspects of one iteration 700 of a patch synthesis technique, such as that described in detail above, in accordance with various embodiments of the present invention. As depicted, the patch synthesis technique is being performed on image 702 having a target region 704. Iteration 700 is a first iteration at a new scale. At 706, the initial nearest neighbor field for the depicted iteration is randomly initialized. Such a random initialization is depicted in FIG. 6A. At 708 an iterative search having two phases, a linear phase and a random phase, is performed to improve upon the randomly assigned nearest-neighbor field. Such an iterative search is discussed in detail in reference to FIGS. 2 and 4 and depicted in FIGS. 6B-C. At 710, a best solution between a nearest-neighbor field from a previous iteration 712 and the nearest neighbor field of the current iteration is selected, after which another iterative search is performed. At 714 an active mask is generated as described in detail above. The black regions of the active mask reflect those pixels that are initially considered inactive, while the white regions reflect those pixels that are considered active. At 716 the edges of the black regions of the active mask that are eroded (i.e., the inactive region is eroded). At 718, a voting process, such as that described elsewhere herein, is performed on those pixels that are indicated as active in the active mask. As such, those pixels that are indicated as inactive in the active mask are not processed in the voting process and, therefore, the processing time is reduced utilizing the active mask.

Figure 8:
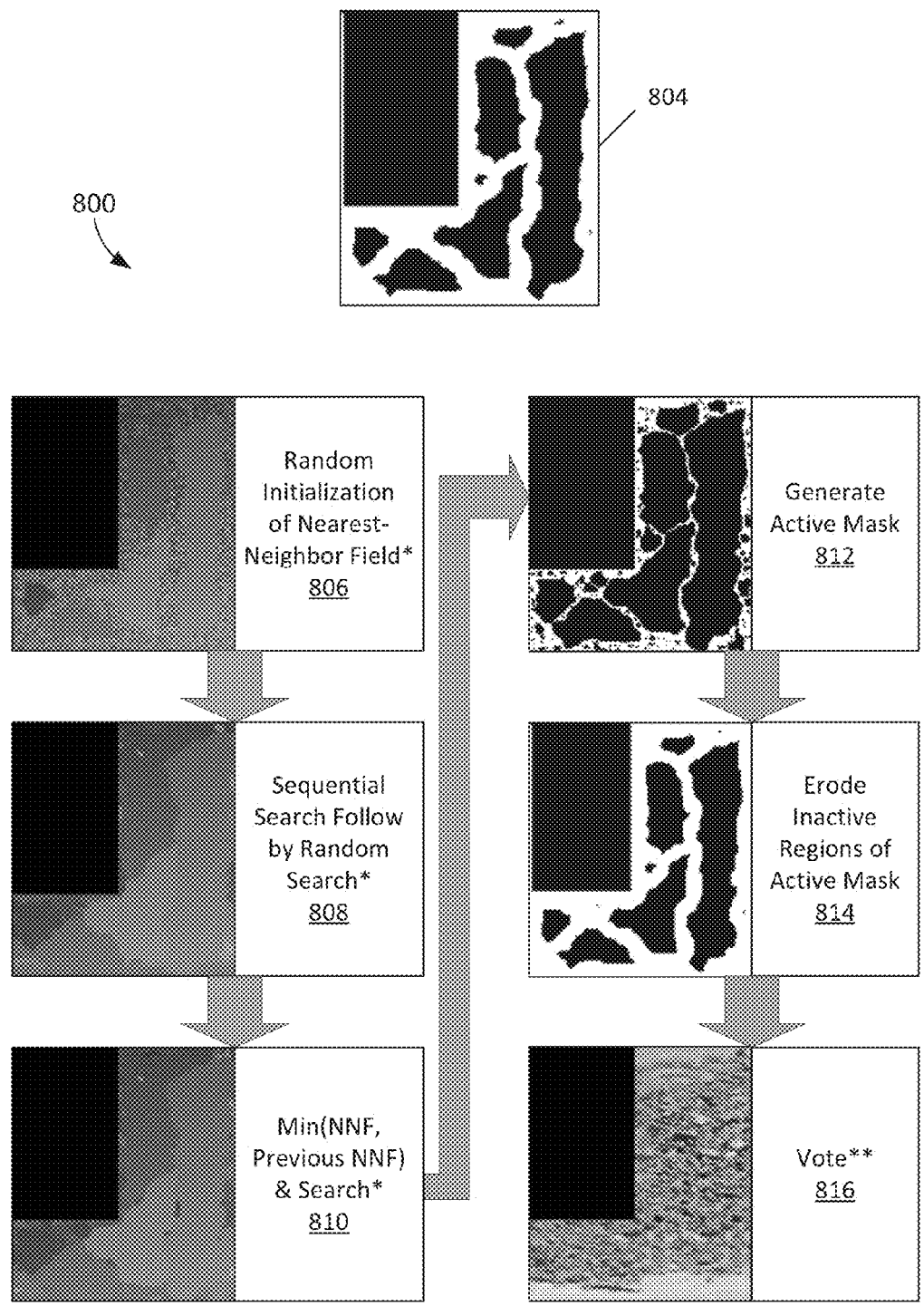
FIG. 8 is another visual depiction of aspects of one iteration of a patch synthesis technique, in accordance with various embodiments of the present invention.

FIG. 8 is another visual depiction of aspects of one iteration 800 of a patch synthesis technique, such as that described in detail above, in accordance with various embodiments of the present invention. As with FIG. 7, the patch synthesis technique is being performed on image 702 having a target region 704. For the sake of clarity, image 702 and target region 704 are not reproduced again in FIG. 8. Iteration 800 depicts a second iteration of the patch synthesis technique that utilizes an active mask 804 from a first iteration, at a new scale, of the patch synthesis technique. The scale depicted in iteration 800 is a later scale than that depicted in iteration 700 of FIG. 7. At 806, an initial nearest neighbor field is randomly initialized. Such a random initialization is depicted in FIG. 6A. As can be seen from the smooth areas of the randomly initialized nearest-neighbor field, those pixels that lie within the inactive, black, regions of active mask 804 are not processed at 806. At 808 an iterative search having two phases, a linear phase and a random phase, is performed to improve upon the randomly assigned nearest-neighbor field. Such an iterative search is discussed in detail in reference to FIGS. 2 and 4 and depicted in FIGS. 6B-C. It will be appreciated that, although not detectable in the depicted image, those pixels that lie within the inactive, black, regions of active mask 804 are not processed at 808. At 810, a best solution between a nearest-neighbor field from the previous iteration and the nearest neighbor field of the current iteration is selected, after which another iterative search is performed. Again, it will be appreciated that, although not detectable in the depicted image, those pixels that lie within the inactive, black, regions of active mask 804 are not processed at 810. At 812 an active mask for the current iteration is generated. Again, the black regions of the active mask generated at 812 reflect those pixels that are initially considered inactive, while the white regions reflect those pixels that are considered active. At 814 the edges of the black regions of the active mask generated at 812 are eroded. At 816, a voting process, such as that described elsewhere herein, is performed on those pixels that are indicated as active in the active mask generated at 812. As such, those pixels that are indicated as inactive in the active mask are not processed in the voting process and, therefore, the processing time is reduced utilizing the active mask.

As described above, the active mask 804 from a previous iteration has been utilized to reduce the processing involved in all of those processes that have a single asterisk, while the active mask from the current iteration is utilized to reduce the processing involved in the voting process, as depicted by the double asterisks. As such, the computational savings of the use of the active mask is multiplied by each of these processes. In the final scale of such a patch synthesis technique, for example, the number of pixels that are inactive could be 70% or more of the pixels. Utilizing an active mask in such a level could result in a 35% or more computational saving on such a last level, alone. While an active mask has been utilized in each of processes 806-810 and 816 of iteration 800, it will be appreciated that this is not required and merely demonstrates example processes that an active mask can be utilized in for computational savings. Use of the active mask in even one of these processes will result in computational savings and, as such, any one or more of these processes can be utilized with an active mask.

Figure 9:
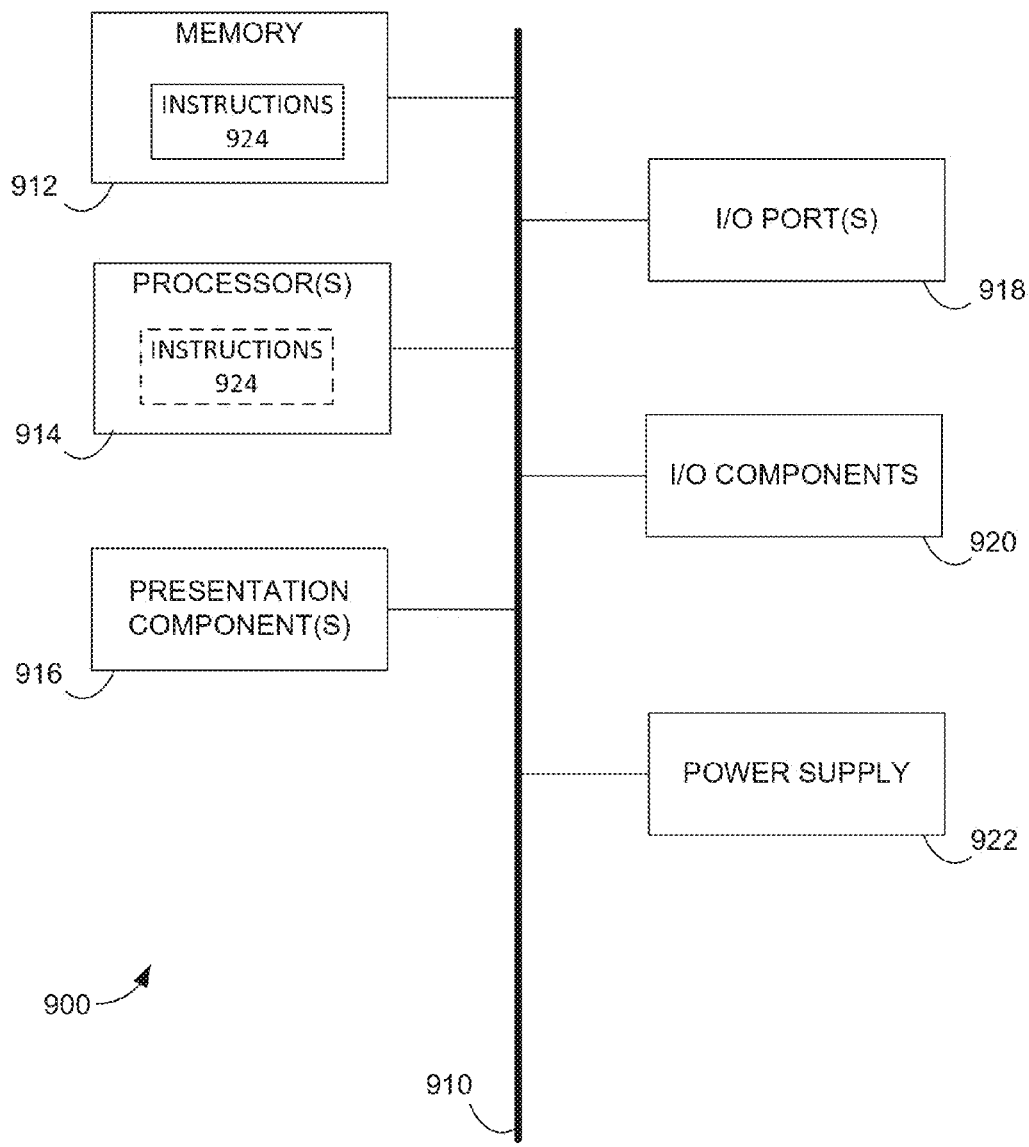
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable storage media having instructions stored thereon, which, when executed by one or more processors of a computing device, provide the computing device with a graphics editor to:
   receive input identifying a target region within an image, wherein the target region is to be synthesized;
   perform a patch synthesis technique to synthesize the target region based on portions of a source region within the image, wherein the portions of the source region are identified by the patch synthesis technique, at least one iteration of the patch synthesis technique including:
   identification of groupings of pixels that have converged in at least one other iteration of the patch synthesis technique; and
   generation of an active mask that indicates one or more portions of the target region as inactive, the one or more portions of the target region being composed of the groupings of pixels that have converged in the at least one other iteration of the patch synthesis technique, wherein at least one process of the patch synthesis technique ignores the one or more portions of the target region that are indicated as inactive by the active mask for the at least one iteration of the patch synthesis technique.

2. The one or more computer-readable storage media of claim 1, wherein generation of an active mask further includes:
   performance of a coherency analysis on individual pixels of the target region, and wherein
   identification of the groupings of pixels that have converged is based, at least in part, on the coherency analysis.

3. The one or more computer-readable storage media of claim 2, wherein identification of the groupings of pixels that have converged is further based on a determined coherency of a set of neighboring pixels of each pixel within the groupings of pixels that have converged.

4. The one or more computer-readable storage media of claim 2, wherein
   identification of groupings of pixels that have potentially converged based on the coherency analysis, wherein the identification of the groupings of pixels that have converged is further based on an erosion of the groupings of pixels that have potentially converged by a predetermined number of pixels.

5. The one or more computer-readable storage media of claim 4, wherein the predetermined number of pixels is based on a patch size utilized in the patch synthesis technique.

6. The one or more computer-readable storage media of claim 1, wherein to perform a patch synthesis technique includes:
performance of an approximate nearest-neighbor search process to identify the portions of the source region that are to be utilized in synthesizing the target region; and
performance of a voting process, based on the identified portions of the source region, to generate colors for individual pixels within the target region.

7. The one or more computer-readable storage media of claim 6, wherein the at least one process of the patch synthesis technique that ignores the one or more portions indicated as inactive by the active mask includes the voting process.

8. The one or more computer-readable storage media of claim 6, wherein the at least one iteration of the patch synthesis technique utilizes an active mask from a previous iteration of the patch synthesis technique, and wherein performance of the approximate nearest-neighbor search process ignores those pixels identified as inactive within the active mask from the previous iteration.

9. A computer-implemented method for synthesizing digital images comprising:
receiving input identifying a target region within an image wherein the target region is to be synthesized;
performing a patch synthesis technique to synthesize the target region based on portions of a source region within the image, wherein the portions of the source region are identified by the patch synthesis technique, at least one iteration of the patch synthesis technique including:
performing a coherency analysis on pixels within the target region; and
generating, based on a result of the coherency analysis, an active mask that indicates one or more portions of the target region as inactive, the one or more portions of the target region being composed of groupings of pixels that have been determined, in at least one other iteration of the patch analysis technique, to have converged, wherein at least one process of the patch synthesis technique ignores the one or more portions of the target region that are indicated as inactive by the active mask for the at least one iteration of the patch synthesis technique.

10. The computer-implemented method of claim 9, further comprising:
identifying the groupings of pixels that have converged based on a determined coherency of a set of neighboring pixels of each pixel within the groupings of pixels.

11. The computer-implemented method of claim 9, wherein generation of an active mask further includes:
identifying groupings of pixels that have potentially converged based on the coherency analysis; and
identifying the groupings of pixels that have converged based on an erosion of the groupings of pixels that have potentially converged by a predetermined number of pixels.

12. The computer-implemented method of claim 9, wherein performing a patch synthesis technique includes:
performing an approximate nearest-neighbor search process to identify the portions of the source region that are to be utilized in synthesizing the target region; and
generating, based on the identified portions of the source region, colors for individual pixels within the target region through a voting process.

13. The computer-implemented method of claim 12, wherein the at least one process of the patch synthesis technique that ignores the one or more portions indicated as inactive by the active mask includes the voting process.

14. The computer-implemented method of claim 12, wherein the at least one iteration of the patch synthesis technique utilizes an active mask from a previous iteration of the patch synthesis technique, and wherein performing the approximate nearest-neighbor search process ignores those pixels identified as inactive within the active mask from the previous iteration.

15. A computing system for synthesizing digital images comprising:
one or more processors; and
one or more non-transitory computer-readable storage media, coupled with the one or more processors, having instructions stored thereon, which, when executed by the one or more processors, provide the computing system with a graphics editor to:
receive input identifying a target region within an image, wherein the target region is to be synthesized;
perform a patch synthesis technique to synthesize the target region based on portions of a source region within the image, wherein the portions of the source region are identified by the patch synthesis technique, at least one iteration of the patch synthesis technique including:
generation of an active mask that indicates one or more portions of the target region as inactive, the one or more portions of the target region being composed of groupings of pixels that have converged in at least one other iteration of the patch synthesis technique, wherein at least one process of the patch synthesis technique ignores the one or more portions of the target region that are indicated as inactive by the active mask for the at least one iteration of the patch synthesis technique.

16. The computing system of claim 15, wherein generation of an active mask further includes:
performance of a coherency analysis on individual pixels of the target region; and
identification of the groupings of pixels that have converged based, at least in part, on the coherency analysis.

17. The computing system of claim 16, wherein identification of groupings of pixels that have converged is based on a determined coherency of a set of neighboring pixels of each pixel within the groupings of pixels.

18. The computing system of claim 16, wherein generation of an active mask further includes:
identification of groupings of pixels that have potentially converged based on the coherency analysis, wherein the identification of the groupings of pixels that have converged is further based on an erosion of the groupings of pixels that have potentially converged by a predetermined number of pixels.

19. The computing system of claim 15, wherein to perform a patch synthesis technique includes:
performance of an approximate nearest-neighbor search process to identify the portions of the source region that are to be utilized in synthesizing the target region; and
performance of a voting process, based on the identified portions of the source region, to generate colors for individual pixels within the target region, wherein the at least one process of the patch synthesis technique that ignores the one or more portions indicated as inactive by the active mask includes the voting process.

20. The computing system of claim 19, wherein the at least one iteration of the patch synthesis technique utilizes an active mask from a previous iteration of the patch synthesis technique, and wherein performance of the approximate nearest-neighbor search process ignores those pixels identified as inactive within the active mask from the previous iteration.

* * * * *